United States Patent
Zhu et al.

(10) Patent No.: US 10,699,436 B2
(45) Date of Patent: Jun. 30, 2020

(54) SPATIAL POSITIONING DEVICE AND POSITIONING PROCESSING METHOD AND DEVICE

(71) Applicant: Goertek Inc., Shandong (CN)

(72) Inventors: Jian Zhu, Shandong (CN); Xiangdong Zhang, Shandong (CN); Zhuo Chen, Shandong (CN); Zhiping Luo, Shandong (CN); Dong Yan, Shandong (CN)

(73) Assignee: Goertek Inc., Shangdong (CN)

( * ) Notice: Subject to any disclaimer, the term of this patent is extended or adjusted under 35 U.S.C. 154(b) by 38 days.

(21) Appl. No.: 15/741,975

(22) PCT Filed: Aug. 11, 2017

(86) PCT No.: PCT/CN2017/097098
§ 371 (c)(1),
(2) Date: Jan. 4, 2018

(87) PCT Pub. No.: WO2018/232900
PCT Pub. Date: Dec. 27, 2018

(65) Prior Publication Data
US 2019/0051010 A1 Feb. 14, 2019

(30) Foreign Application Priority Data
Jun. 21, 2017 (CN) .......................... 2017 1 0474296

(51) Int. Cl.
*G06T 7/73* (2017.01)
*G06T 7/55* (2017.01)
(Continued)

(52) U.S. Cl.
CPC ............. *G06T 7/74* (2017.01); *G06T 7/55* (2017.01); *G06T 7/593* (2017.01); *H04N 5/247* (2013.01); *G06T 2207/10012* (2013.01)

(58) Field of Classification Search
CPC .................................. G06T 7/55; G06T 7/74
See application file for complete search history.

(56) References Cited

U.S. PATENT DOCUMENTS

2013/0258067 A1* 10/2013 Zhang .................. H04N 13/25
348/48
2017/0184449 A1  6/2017 Ozawa

FOREIGN PATENT DOCUMENTS

| CN | 103868460 A | 6/2014 |
|---|---|---|
| CN | 104933436 A | 9/2015 |

(Continued)

OTHER PUBLICATIONS

International Searching Authority, International Search Report (ISR) and Written Opinion for International Application No. PCT/CN2017/097098, dated Mar. 28, 2018, 10 pages, State Intellectual Property Office of the P.R.C., China.

*Primary Examiner* — Girumsew Wendmagegn
(74) *Attorney, Agent, or Firm* — Alston & Bird LLP

(57) ABSTRACT

The present invention discloses a spatial positioning device, and a positioning processing method and device. The spatial positioning device comprises a set of cameras arranged horizontally and a set of cameras arranged vertically, wherein each set comprises at least two cameras with the same parameters including an image resolution, a camera lens angle in the horizontal direction and a camera lens angle in the vertical direction; and the at least two cameras in the set of cameras arranged horizontally are aligned in the horizontal direction, and the at least two cameras in the set of cameras arranged vertically are aligned in the vertical direction. In the spatial positioning device provided by the present invention, as the sets of cameras are arranged in the different directions, it is possible to effectively reduce or even eliminate the number of blind spots in the process of image shooting in the single direction. In addition, the (Continued)

additionally arranged set of cameras arranged vertically may also improve the measurement accuracy of a spatial position coordinate of an object in the vertical direction, so as to improve the positioning accuracy of the object.

20 Claims, 8 Drawing Sheets

(51) Int. Cl.
*H04N 5/247* (2006.01)
*G06T 7/593* (2017.01)

(56) References Cited

FOREIGN PATENT DOCUMENTS

| | | | |
|---|---|---|---|
| CN | 106456070 A | | 2/2017 |
| CN | 106529495 A | * | 3/2017 |
| CN | 106529495 A | | 3/2017 |
| CN | 106643699 A | * | 5/2017 |
| CN | 106643699 A | | 5/2017 |

* cited by examiner

SPATIAL POSITIONING DEVICE AND POSITIONING PROCESSING METHOD AND DEVICE

CROSS REFERENCE TO RELATED APPLICATIONS

This application is a national stage application, filed under 35 U.S.C. § 371, of International Application No. PCT/CN2017/097098, filed Aug. 11, 2017, which claims priority to Chinese Application No. 201710474296.4, filed Jun. 21, 2017, the contents of both of which as are hereby incorporated by reference in their entirety.

BACKGROUND

Technical Field

The present invention relates to the field of spatial positioning technologies, and in particularly, to a spatial positioning device, a positioning processing method for the spatial positioning device, and a positioning processing device for the spatial positioning device.

Description of Related Art

A present spatial positioning device mainly uses a binocular camera to acquire spatial position data, including a depth value, a spatial position coordinate in the horizontal direction and a spatial position coordinate in the vertical direction, of a spatial object through images collected by the binocular camera, so as to achieve spatial positioning of the spatial object. On this basis, an action of the spatial object may be determined by comparing the spatial position data of the spatial object at different time points, achieving a human-machine interaction function based on an action command.

However, there is a problem about a blind area when the binocular camera is applied to spatial positioning, the blind area being a non-overlapping area of images shot by two cameras. Referring to FIG. 1, a left camera C1 corresponds to a shooting area Va1; and a right camera C2 corresponds to a shooting area Va2. The two cameras C1 and C2 have a blind area in a non-overlapping area of the shooting areas Va1 and Va2, and may also have a blind area in an overlapping area of the shooting areas Va1 and Va2 under a certain condition as the spatial object is rugged. Taking FIG. 1 as an example, the left camera C1 has a blind area D1 in the overlapping area, and the right camera C2 has a blind area D2 in the overlapping area, so that for the spatial object, features that the left camera C1 can shoot include F1, F2, F3 F4, F6 and F7, and features that the right camera C2 can shoot include F2, F4, F5, F6 and F7, each feature being corresponding to a pixel on the images. Thus, in the features F1-F7, as the features F3 and F5 are located in the blind areas of the right C2 and left camera C1, respectively, and thus are blind spots of the binocular camera, only depth values of the features F2, F4 and F6 are obtained according to the images shot by the left and right cameras, C1 and C2. As the features F3 and F5 are in the overlapping area (a central area) of the shooting areas of the two cameras, that is, the features F3 and F5 are located in a desired spatial positioning area, and it is a severe technical defect if a depth value of the area cannot be acquired. Therefore, the blind spot problem in the overlapping area needs to be solved urgently.

BRIEF SUMMARY

An objective of the present invention is to provide a new technical scheme of spatial positioning so as to at least reduce the number of blind spots in an overlapping area.

According to a first aspect of the present invention, there is provided a spatial positioning device comprising a set of cameras arranged horizontally and a set of cameras arranged vertically. Each set comprises at least two cameras with the same parameters including an image resolution, a camera lens angle in the horizontal direction and a camera lens angle in the vertical direction. The at least two cameras in the set of cameras arranged horizontally are aligned in the horizontal direction, and the at least two cameras in the set of cameras arranged vertically are aligned in the vertical direction.

According to a second aspect of the present invention, there is also provided a positioning processing method for the spatial positioning device according to the first aspect of the present invention, the method comprising: acquiring images collected by the set of cameras arranged horizontally and the set of cameras arranged vertically at the same time point, respectively; calculating a horizontal pixel-value differencs (PVD) between a pair of pixels indicating the same feature in the same object according to the images collected by the set of cameras arranged horizontally, and calculating a vertical PVD between a pair of pixels indicating the same feature in the same object according to the images collected by the set of cameras arranged vertically; calculating horizontal PVDs corresponding to other pixels in the images collected by the set of cameras arranged horizontally according to the horizontal PVDs between pairs of pixels, and calculating vertical PVDs corresponding to other pixels in the images collected by the set of cameras arranged vertically according to the vertical PVDs between pairs of pixels; according to the horizontal PVD corresponding to each pixel in the images collected by the set of cameras arranged horizontally, calculating a depth value of a feature indicated by this pixel as a horizontal depth value, and according to the vertical PVD corresponding to each pixel in the images collected by the set of cameras arranged vertically, calculating a depth value of a feature indicated by this pixel as a vertical depth value; and calculating according to the horizontal and vertical depth values to obtain spatial position coordinates of a corresponding feature in the horizontal and vertical directions.

According to a third aspect of the present invention, there is also provided a positioning processing device for the spatial positioning device according to the first aspect of the present invention, the positioning processing device comprising: an image acquisition module configured to acquire images collected by the set of cameras arranged horizontally and the set of cameras arranged vertically at the same time point, respectively; a PVD calculation module configured to calculate a horizontal PVD between a pair of pixels indicating the same feature in the same object according to the images collected by the set of cameras arranged horizontally, and a vertical PVD between a pair of pixels indicating the same feature in the same object according to the images collected by the set of cameras arranged vertically; a full pixel matching module configured to calculate horizontal PVDs corresponding to other pixels in the images collected by the set of cameras arranged horizontally according to the horizontal PVDs between pairs of pixels, and vertical PVDs corresponding to other pixels in the images collected by the set of cameras arranged vertically according to the vertical PVDs between pairs of pixels; a depth value calculation module configured to calculate a depth value of a feature indicated by each pixel according to the horizontal PVD corresponding to this pixel in the images collected by the set of cameras arranged horizontally as a horizontal depth value, and a depth value of a feature indicated by each pixel according to the vertical PVD corresponding to this pixel in the images collected by the set of cameras arranged vertically as a vertical depth value; and a coordinate calculation module configured to calculate according to the horizontal and vertical depth values to obtain spatial position coordinates of a corresponding feature in the horizontal and vertical directions.

A beneficial effect of the present invention is that the sets of cameras arranged set of cameras arranged horizontally and vertically respectively are arranged to collect the images simultaneously. As the two sets of cameras are arranged in the different directions, it is possible to effectively reduce or even eliminate the number of blind spots in the process of image shooting in the single direction. In addition, the additionally arranged set of cameras arranged vertically may also improve the measurement accuracy of the spatial position coordinate of the object in the vertical direction, so as to improve the positioning accuracy of the object.

Further features of the present invention and advantages thereof will become apparent from the following detailed description of exemplary embodiments according to the present invention with reference to the attached drawings.

BRIEF DESCRIPTION OF THE FIGURES

The accompanying drawings, which are incorporated in and constitute a part of the specification, illustrate embodiments of the invention and, together with the description thereof, serve to explain the principles of the invention.

DETAILED DESCRIPTION OF VARIOUS EMBODIMENTS

Figure 1:
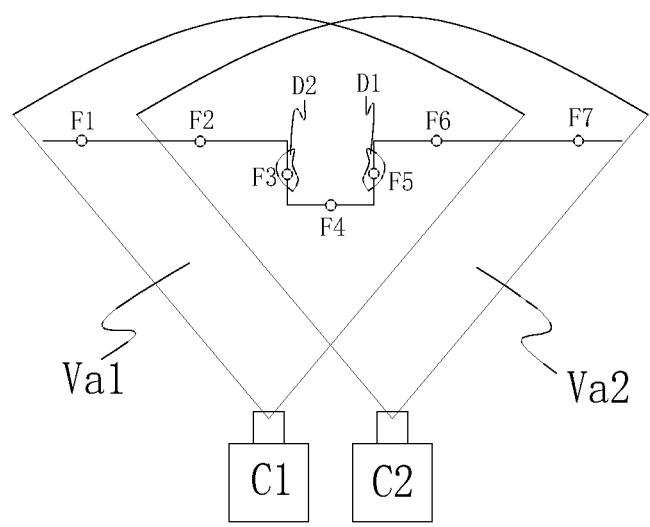
FIG. 1 is a schematically structural view of a binocular camera in the prior art.

Various exemplary embodiments of the present invention will now be described in detail with reference to the drawings. It should be noted that the exemplary embodiment are merely illustrative and are in no way intended to limit the present invention, its application, or uses.

<Camera Configuration Structure of Spatial Positioning Device>

A spatial positioning device according to the embodiment of the present invention comprises a set of cameras arranged horizontally and a set of cameras arranged vertically.

The set of cameras arranged horizontally comprises at least two cameras with the same parameters, and the at least two cameras in the set of cameras arranged horizontally are aligned in the horizontal direction.

The set of cameras arranged vertically further comprises at least two cameras with the same parameters, and the at least two cameras in the set of cameras arranged vertically are aligned in the vertical direction.

The above parameters comprise an image resolution $P_x*P_y$, a visual field angle $2\phi$ in the horizontal direction and a visual field angle $2\varphi$ in the vertical direction.

The image resolution $P_x*P_y$ of the camera determines the number of pixels in each row (in the horizontal direction) and the number of pixels in each column (in the vertical direction) of a collected image, wherein the number of pixels in each row is $P_x$, and the number of pixels in each column is $P_y$.

The visual field angle $2\phi$ of the camera in the horizontal direction determines the maximum shooting range of the camera in the horizontal direction. The horizontal direction in the present invention specifically refers to the horizontal direction calibrated by an image sensor of the camera.

The visual field angle $2\varphi$ of the camera in the vertical direction determines the maximum shooting range of the camera in the vertical direction. The vertical direction in the present invention specifically refers to the vertical direction calibrated by the image sensor of the camera, and is perpendicular to the horizontal direction calibrated by the image sensor.

The at least two cameras in the set of cameras arranged horizontally are aligned in the horizontal direction. This alignment causes connection lines of any same points (e.g., center points and four corner points) of the image sensors of the at least two cameras in the set of cameras arranged horizontally to be parallel to the horizontal direction.

For the cameras of the same type, for example, the alignment of the cameras in the horizontal direction may be achieved by setting bottom surfaces of the all cameras to be coplanar and front end surfaces of the all cameras to be coplanar.

The at least two cameras in the set of cameras arranged vertically are aligned in the vertical direction. This alignment causes connection lines of any same points (e.g., center points and four corner points) of the image sensors of the at least two cameras in the set of cameras arranged vertically to be parallel to the vertical direction.

For the cameras of the same type, for example, the alignment of the cameras in the vertical direction may be achieved by setting front end surfaces of the cameras to be coplanar and left and/or right end surfaces of the cameras to be coplanar.

The spatial positioning device provided by the embodiment of the present invention is provided with the set of cameras arranged horizontally and the set of cameras arranged vertically in the horizontal direction and the vertical direction, respectively, so that two groups of depth value data of features, which are recognized by comparing the pixel contents, of the spatial object at the same time are obtained by controlling the two sets of cameras to collect the images simultaneously, and the number of blind spots in the process of image shooting in the single direction may be effectively reduced or even eliminated. In addition, the set of cameras arranged horizontally and the sets of cameras arranged vertically may also improve the measurement accuracy of the spatial position coordinates of the object in the horizontal and vertical directions, respectively, so as to improve the positioning accuracy of the spatial object. The spatial positioning device according to the embodiment of the present invention may comprise one set of cameras arranged horizontally, or two or more such set of cameras arranged horizontally.

The spatial positioning device according to the embodiment of the present invention may comprise one set of cameras arranged vertically, or two or more such set of cameras arranged vertically.

<Positioning Processing Method for Spatial Positioning Device>

Figure 2:
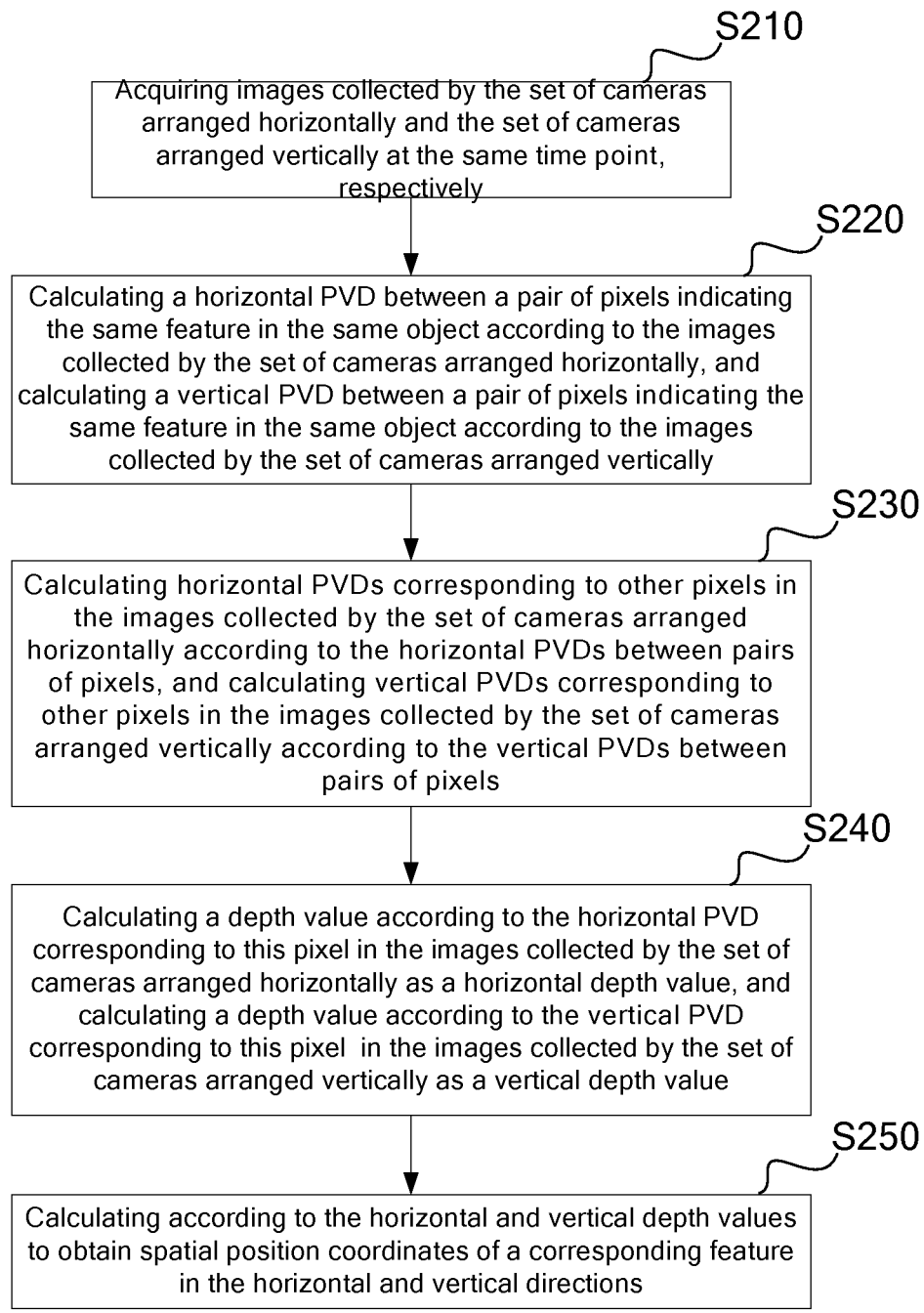
FIG. 2 is a schematic view of a flow chart of a positioning processing method according to an embodiment of the present invention.

FIG. 2 is a schematic view of a flow chart of a positioning processing method for the above spatial positioning device.

As shown in FIG. 2, the positioning processing method may comprise the following steps.

In step S210, images collected by the set of cameras arranged horizontally and the set of cameras arranged vertically at the same time point are acquired respectively.

The positioning processing device for implementing the positioning processing method provided by the present invention may use, for example, at least one processor to receive the image collected by each camera in the sets of cameras arranged horizontally and vertically respectively.

In step S220, a horizontal PVD between a pair of pixels indicating the same feature in the same object according to the images collected by the set of cameras arranged horizontally is calculated, and a vertical PVD between a pair of pixels indicating the same feature in the same object according to the images collected by the set of cameras arranged vertically is calculated.

Each pair of pixels indicating the same feature in the same object shows that an image content of the pair of pixels represents the same feature of the same object. For example, the image content of the pair of pixels may represent the same hand feature of the same person.

In the images collected by the sets of cameras arranged horizontally and vertically respectively, the object feature of the pair of pixels that can be extracted by comparing the contents of the pixels is an edge feature, a corner feature or the like of the object. For example, in the images collected by the set of cameras arranged horizontally, if there are pixels indicating hand features of the same person in two images, by comparison, it is known that the pixels indicating the same edge feature of the hand are located in the same pixel row in the two images, but at different pixel positions, so a difference value between the pixel coordinates of the two pixels is the horizontal PVD.

For example, in the images collected by the set of cameras arranged vertically, if there are pixels indicating head features of the same person in two images, by comparison, it is known that the pixels indicating the same edge feature of the head are located in the same pixel column in the two images, but at different pixel positions, so a difference value between the pixel coordinates of the two pixels is the vertical PVD.

In this step, all pixels may be extracted from the images collected by the sets of cameras arranged horizontally and vertically, respectively, and each pixel is marked by the source camera and the pixel coordinates of the pixel. Then, the pixels from the set of cameras arranged horizontally are compared respectively, and the pixels from the set of cameras arranged vertically are compared respectively to obtain the pairs of pixels indicating the same features in the same object. Thus, the horizontal PVD or the vertical PVD is obtained according to the pixel positions of each pair of pixels.

In step S230, horizontal PVDs corresponding to other pixels in the images acquired by the set of cameras arranged horizontally are calculated based on the horizontal PVD, and vertical PVDs corresponding to other pixels in the images acquired by the set of cameras arranged vertically are calculated based on the vertical PVD.

The object features obtained by comparing the pixel contents are limited to edge features, corner features and the like. But, the measurement of the spatial object requires not only spatial position data of features indicated by these pairs of pixels, but also spatial position data of other features, so that in step S230, the horizontal PVDs corresponding to other pixels in the images collected by the set of cameras arranged horizontally are calculated by taking the horizontal PVD between the pair of pixels as a reference, and the vertical PVDs corresponding to other pixels in the images collected by the set of cameras arranged vertically are calculated by taking the vertical PVD as a reference.

Taking a first image collected by the set of cameras arranged horizontally as an example, if a part of pixels of the first image and other images (acquired by other cameras, except for the camera for collecting the first image,) collected by the set of cameras arranged horizontally form pairs of pixels through comparison, the other part of pixels, except for the part of the pixels of the first image, are the other pixels of the first image.

Taking a third image collected by the set of cameras arranged vertically as an example, if a part of pixels of the third image and other images (acquired by other cameras, except for the camera for collecting the third image,) collected by the set of cameras arranged vertically form pairs of pixels through comparison, the other part of pixels, except for the part of the pixels of the third image, are the other pixels of the third image.

Through step S230, the horizontal PVDs corresponding to all pixels of each image collected by the set of cameras arranged horizontally and the vertical PVDs corresponding to all pixels of each image collected by the set of cameras arranged vertically may be obtained.

For example, in an image collected by the set of cameras arranged horizontally, a pixel A1 and a pixel A2 in another image collected by the set of cameras arranged horizontally form a pair of pixels A, and the horizontal PVD between the pair of pixels A is $d_{xa}$; and a pixel B1 and a pixel B2 in another image forms a pair of pixels B, and the horizontal PVD between the pair of pixels B is $d_{xb}$. Here, the pixel A1 and the pixel B1 are located at the same pixel row, and are spaced by n pixels in the horizontal direction. In this way, the horizontal PVD of each pixel in the n pixels may be obtained by performing linear interpolation on the horizontal PVD $d_{xa}$ and the horizontal PVD $d_{xb}$ at the n pixels.

For example, in an image collected by the set of cameras arranged vertically, a pixel C1 and a pixel C2 in another image collected by the set of cameras arranged vertically form a pair of pixels C, and the vertical PVD between the pair of pixels C is $d_yc$; and a pixel D1 and a pixel D2 in another image forms a pair of pixels D, and the vertical PVD between the pair of pixels D is $d_{yd}$. Here, the pixel C1 and the pixel D1 are located at the same pixel column, and are spaced by m pixels in the vertical direction. In this way, the vertical PVD between each pixel in the m pixels may be obtained by performing linear interpolation on the vertical PVD $d_y$, and the vertical PVD $d_{yd}$ at the m pixels.

In step S240, a depth value of a feature indicated by each pixel according to the horizontal PVD corresponding to this pixel in the image collected by the set of cameras arranged horizontally is calculated as a horizontal depth value, and a depth value of a feature indicated by each pixel according to the vertical PVD corresponding to this pixel in the image collected by the set of cameras arranged vertically is calculated as a vertical depth value.

Figure 3A:
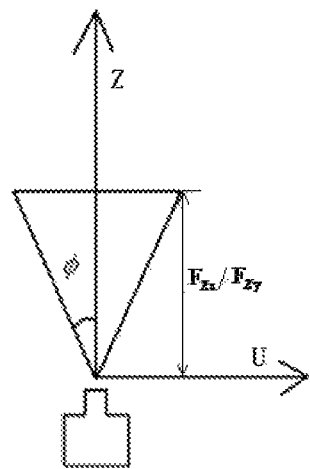
FIG. 3a is a schematic view of a conversion relationship between pixels and spatial position coordinates of any of the cameras in the horizontal direction.
Figure 3B:
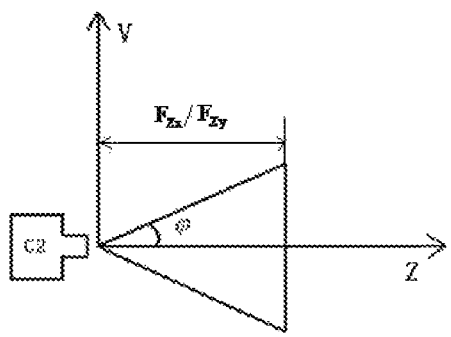
FIG. 3b is a schematic view of a conversion relationship between pixels and spatial position coordinates of any of the cameras in the vertical direction.

The above horizontal depth value is a distance between a corresponding feature and a plane of an image sensor of the set of cameras arranged horizontally, i.e., the distance in a Z-axis direction shown in FIGS. 3a and 3b.

The above vertical depth value is a distance between a corresponding feature and a plane of an image sensor of the set of cameras arranged vertically, i.e., the distance in the Z-axis direction shown in FIGS. 3a and 3b.

In this step, if for a corresponding feature F, its horizontal PVD is $d_x$, its vertical PVD is $d_y$, its horizontal depth value is $F_{zx}$, and its vertical depth value is $F_{zy}$, a relationship between the horizontal depth value $F_{zx}$ and the horizontal PVD $d_x$, and a relationship between the vertical depth value $F_{zy}$ and the vertical PVD $d_y$ are described below with reference to FIGS. 3a and 3b.

For any camera in the set of cameras arranged horizontally, referring to FIGS. 3a and 3b, pixel coordinates of a pixel, indicating the feature F, on an image collected by the camera are ($F_x$, $F_y$), relationships between the pixel coordinates and spatial position coordinates ($U_F$, $V_E$) of the feature F in the horizontal and vertical directions are:

According to FIG. 3a, $U_F = \sigma_{Fx} \times Fx + U_0$ and $$\sigma_{Fx} = \frac{2 \times F_{Zx} \times \tan\phi}{Px}; \qquad \text{Formula (1)}$$

And according to FIG. 3b, $V_F = \sigma_{Fy} \times Fy + V_0$ and $$\sigma_{Fy} = \frac{2 \times F_{Zx} \times \tan\varphi}{Py}. \qquad \text{Formula (2)}$$

In FIGS. 3a and 3b, a U-axis, a V-axis and the Z-axis represent a spatial coordinate system, wherein the U-axis is set in the horizontal direction, the V-axis is set in the vertical direction, and the Z-axis is perpendicular to the plane of the image sensor.

In the formulas (1) and (2), ($U_F$, $V_E$) are the spatial position coordinates of the feature F in the horizontal and vertical directions; ($U_0$, $V_0$) are the spatial position coordinates of a feature indicated by a pixel whose pixel coordinates are (0, 0) in the horizontal and vertical directions; ($F_x$, $F_y$) are the pixel coordinates of the pixel of the feature F; $F_{zx}$ is a horizontal depth value, $P_x$ is the number of pixels in each row of the corresponding camera, and $P_y$ is the number of pixels in each column of the corresponding camera; $\phi$ represents half of a visual field angle in the horizontal direction of a corresponding camera; and $\varphi$ represents half of a visual field angle in the vertical direction of the corresponding camera.

If the feature F is present in the images collected by the two cameras of the set of cameras arranged horizontally, for one of the cameras, a formula (3) may be obtained as follows based on the above formula (1):

$$U_F = \sigma_{Fx} \times Fx + U_0 \qquad \text{Formula (3);}$$

And for the other camera, a formula (4) may be obtained as follows based on the above formula (1):

$$U_F = \sigma_{Fx} \times (Fx - dx) + (U_0 + a) \qquad \text{Formula (4).}$$

Here, a represents the distance of the two cameras in the horizontal direction, namely, the horizontal baseline length; and $d_x$ is the horizontal PVD.

Combining formulas (3) and (4), a formula (5) may be obtained as follows:

$$F_{Zx} = \frac{a \times Px}{2 \times dx \times \tan\phi}. \qquad \text{Formula (5)}$$

Therefore, if the feature F is present in the images collected by the two cameras of the set of cameras arranged horizontally at the same time point, the spatial position data of the feature F may be calculated according to the formulas (1), (2) and (5), the spatial position data including the horizontal depth value $F_{zx}$, and the spatial position coordinates ($U_F$, $V_E$) in the horizontal and vertical directions of the feature F.

For any camera in the set of cameras arranged vertically, similarly, referring to FIGS. 3a and 3b, pixel coordinates of a pixel, indicating the feature F, on an image collected by the camera are ($F_x$, $F_y$), relationships between the pixel coordinates and spatial position coordinates ($U_F$, $V_E$) of the feature F in the horizontal and vertical directions are:

According to FIG. 3a, $U_F = \sigma_{Fx} \times Fx + U_0$, and $$\sigma_{Fx} = \frac{2 \times F_{Zy} \times \tan\phi}{Px}; \qquad \text{Formula (6)}$$

And according to FIG. 3b, $V_F = \sigma_{Fy} \times Fy + V_0$, and $$\sigma_{Fy} = \frac{2 \times F_{Zy} \times \tan\varphi}{Py}. \qquad \text{Formula (7)}$$

In the formulas (6) and (7), ($U_F$, $V_E$) are the spatial position coordinates of the feature F in the horizontal and vertical directions; ($U_0$, $V_0$) are the spatial position coordinates of a feature indicated by a pixel whose pixel coordinates are (0, 0) in the horizontal and vertical directions; ($F_x$, $F_y$) are the pixel coordinates of the pixel of the feature F; $F_{zy}$ is a vertical depth value, $P_x$ is the number of pixels in each row of a corresponding camera, and $P_y$ is the number of pixels in each column of the corresponding camera; $\phi$ represents half of a visual field angle in the horizontal direction of a corresponding camera; and $\varphi$ represents half of a visual field angle in the vertical direction of the corresponding camera.

If the feature F is present in the images collected by the two cameras of the set of cameras arranged vertically, for one of the cameras, a formula (8) may be obtained as follows based on the above formula (7):

$$V_F = \sigma_{Fy} \times Fy + V_0 \qquad \text{Formula (8);}$$

And for the other camera, a formula (9) may be obtained as follows based on the above formula (2):

$$V_F = \sigma_{Fy} \times (Fy - dy) + (V_0 + b) \qquad \text{Formula (9).}$$

Here, b represents the distance of the two cameras in the vertical direction, namely, the vertical baseline length; and $d_y$ is the vertical PVD.

Combining formulas (8) and (9), a formula (10) may be obtained as follows:

$$F_{Zy} = \frac{b \times Py}{2 \times dy \times \tan \varphi}. \quad \text{Formula (10)}$$

Therefore, if the feature F is present in the images collected by the two cameras of the set of cameras arranged vertically at the same time point, the spatial position data of the feature F may be calculated according to the formulas (6), (7) and (10), the spatial position data including the vertical depth value $F_{zy}$, and the spatial position coordinates $(U_F, V_F)$ in the horizontal and vertical directions of the feature F.

In step S250, spatial position coordinates of a corresponding feature in the horizontal and vertical directions are obtained through calculation according to the horizontal and vertical depth values.

In step S250, the spatial position coordinates of the feature F in the horizontal and vertical directions may be obtained through calculation according to the above formulas (1), (2) and (5) or the above formulas (6), (7) and (10).

It can be seen that according to the spatial positioning device provided by the present invention, the images collected by the sets of cameras arranged horizontally and vertically at the same time point may be processed by the above positioning processing method. As the sets of cameras are arranged in the different directions, in step S220, the pairs of pixels indicating the same features in the same object can be extracted by comparing the pixel contents in the different directions, and the accurate pixel difference of each pixel is obtained as a reference pixel. Thus, the number of the blind spots is reduced or even eliminated through the mutual complementation of the pairs of pixels in the different directions. Therefore, in step S230, there are more reference PVDs for calculating the pixel differences corresponding to the other pixels, so that the accuracy of the pixel difference corresponding to each pixel in all the images calculated through interpolation or other means is improved, improving the reliability of spatial positioning.

Moreover, in the prior art, due to the inherent distortion of the cameras, images obtained through the cameras are slightly different from the object, which is reflected in the fact that an image located at the middle is the same as the middle of the object, but an image at the edge is slightly smaller than the edge of the object, resulting in errors in the object measurement based on the images. However, according to the spatial positioning device provided by the embodiment of the present invention, as the set of cameras arranged horizontally and the set of cameras arranged vertically are respectively arranged, the horizontal baseline length, having a reference function, between the two cameras in the set of cameras arranged horizontally may be utilized to effectively reduce an error of the spatial position coordinate, calculated via the horizontal PVD, of the feature F in the horizontal direction, and an error in the measurement of the object in the horizontal direction. This enables the measurement errors in the horizontal direction to be controlled within an acceptable range, which is advantageous for the measurement of the object in the horizontal direction. Meanwhile, the vertical baseline length, having a reference function, between the two cameras in the set of cameras arranged vertically may also be utilized to effectively reduce an error of the spatial position coordinate, calculated via the vertical PVD, of the feature F in the vertical direction, and an error in the measurement of the object in the vertical direction. This enables the measurement errors in the vertical direction to be controlled within an acceptable range, which is advantageous for the measurement of the object in the vertical direction.

The spatial positioning device provided by the embodiment of the present invention may be fixedly mounted in a selected positioning space.

The spatial positioning device provided by the embodiment of the present invention may also be fixedly mounted on a moving object, for example, on a virtual reality helmet in a virtual reality application.

<Hardware Structure of Positioning Processing Device>

Each camera of the spatial positioning device according to the embodiment of the present invention needs to send the image collected by it to the above positioning processing device for implementing the above positioning processing method to perform extraction, matching, and the like on the pixels, so as to calculate according to the image collected by each camera to obtain the spatial position data of a required feature.

Figure 4:
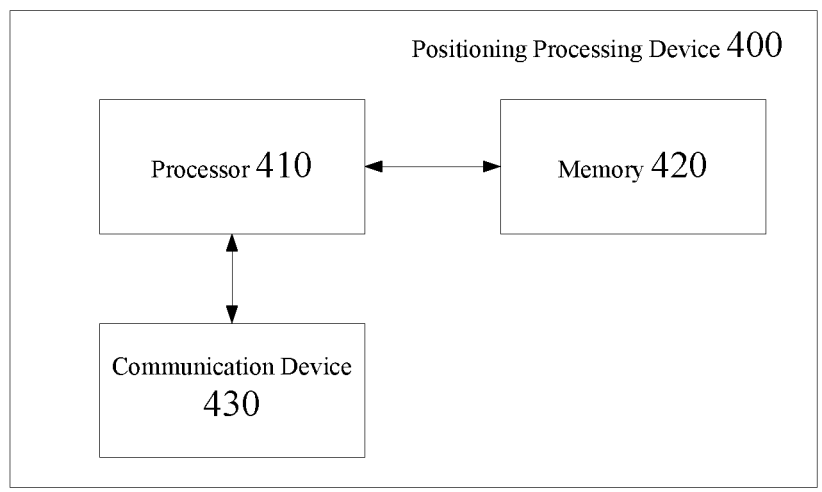
FIG. 4 is a schematic view of a hardware structure of a positioning processing device according to an embodiment of the present invention.

FIG. 4 is a schematic view of a hardware structure of a positioning processing device according to an embodiment of the present invention.

As shown in FIG. 4, the positioning processing device may comprise at least one processor 410 and at least one memory 420.

The memory 420 is configured to store instructions for controlling the processor 410 to perform operations so as to perform the positioning processing method provided by the present invention.

The memory 420 may comprise a high-speed random access memory, and may also comprise a nonvolatile memory, such as one or more magnetic storage devices, a flash memory, or other nonvolatile solid state memories.

In the at least one processor 410, a first processor and each camera of the spatial positioning device are connected via, for example, an MIPI bus, so as to obtain an image collected by each camera.

The first processor may directly perform the positioning processing method according to the present invention after acquiring the image collected by each camera, so as to obtain the spatial position data of the spatial object.

The first processor may also preprocess each image after acquiring the image collected by each camera and send the pre-processed image to another processor in the at least one processor via a communication device 430 or a data bus in FIG. 4 to perform the positioning processing method provided by the present invention.

The communication device 430 may be a wired communication device, such as a USB communication device, or the like.

The communication device 430 may also be a wireless communication device, such as a Bluetooth communication device, a WIFI communication device, or the like.

The first processor may also calculate depth value data of the spatial object according to the positioning processing method provided by the present invention first after acquiring the image collected by each camera and send the depth value data to another processor in the at least one processor via the communication device 430 or the data bus in FIG. 4 to perform the positioning processing method provided by the present invention, so as to further calculate other spatial position data of the spatial object, the spatial position data including, for example, spatial position coordinates in the horizontal and vertical directions.

Example 1

Figure 5:
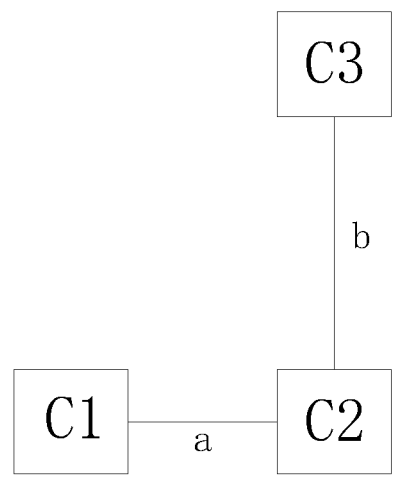
FIG. 5 is a schematically structural view of a spatial positioning device according to an embodiment of the present invention.

FIG. 5 is a schematic view of a configuration structure of a spatial positioning device according to an embodiment of the present invention.

According to FIG. 5, in this embodiment, the spatial positioning device comprises a first camera C1, a second camera C2 and a third camera C3 which have the same parameters including an image resolution $P_x*P_y$, a visual field angle $2\phi$ in the horizontal direction, and a visual field angle $2\varphi$ in the vertical direction.

The first camera C1 and the second camera C2 are aligned in the horizontal direction to form a pair of horizontal cameras of the set of cameras arranged horizontally.

The third camera C3 and the second camera C2 are aligned in the vertical direction to form a pair of vertical cameras of the set of cameras arranged vertically.

In this embodiment, as the pair of horizontal cameras and the pair of the vertical cameras share the second camera C2, a horizontal baseline length and a vertical baseline length may be determined by taking the second camera C2 as a reference, and the full pixel matching may be performed between the pair of the horizontal cameras and the pair of the vertical cameras by taking the second camera C2 as a reference, so that mutual complementation of spatial position data of the same spatial object is achieved to perform flexible positioning according to a positioning requirement.

In the spatial positioning device according to the embodiment, taking the feature F5 in FIG. 1 as an example, the feature F5 is a blind spot of the first camera C1. Thus, an accurate depth value of the feature F5 cannot be obtained according to the pair of horizontal cameras C1 and C2. However, the additionally arranged camera C3 and the camera C2 form a pair of vertical cameras, so that the accurate depth value of the feature F5 may be obtained according to the pair of vertical cameras C2 and C3 in a case that the feature F5 is shot by the camera C3, and the feature F5 is no longer the blind spot for the spatial positioning device. It can be seen that through the spatial positioning device provided by the embodiment, at least the number of blind spots may be reduced or even eliminated, improving the reliability of spatial positioning.

Moreover, in the spatial positioning device according to the embodiment, the camera C1 and the camera C2 form the pair of horizontal cameras, there is a horizontal baseline length a between the two cameras as a reference, and the horizontal baseline length a, which can effectively reduce an error in the measurement of the object in the horizontal direction through the spatial position coordinate, calculated via the horizontal PVD, of the feature F in the horizontal direction, so that the measurement error of the object in the horizontal direction may be controlled within an acceptable range. This is because the measurement of the object in the horizontal direction is based on relative difference values of the spatial position coordinates of all features of the object along the horizontal direction. If the spatial position coordinates of all the features in the horizontal direction are data obtained based on the horizontal baseline length a, the same errors can be eliminated when calculating the relative difference values, thereby improving the measurement accuracy in the horizontal direction.

Similarly, in the spatial positioning device according to the embodiment, the camera C2 and the camera C3 further form the pair of vertical cameras, there is a vertical baseline length b between the two cameras as a reference, and the vertical baseline length b may effectively reduce an error in the measurement of the object in the vertical direction through the spatial position coordinate, calculated via the vertical PVD, of the feature F in the vertical direction, so that the measurement error of the object in the vertical direction may be controlled within an acceptable range. This is because the measurement of the object in the vertical direction is based on relative difference values of the spatial position coordinates of all features of the object along the vertical direction. If the spatial position coordinates of all the features in the vertical direction are data obtained based on the vertical baseline length b, the same errors can be eliminated when calculating the relative difference values, thereby improving the measurement accuracy in the vertical direction.

Figure 6:
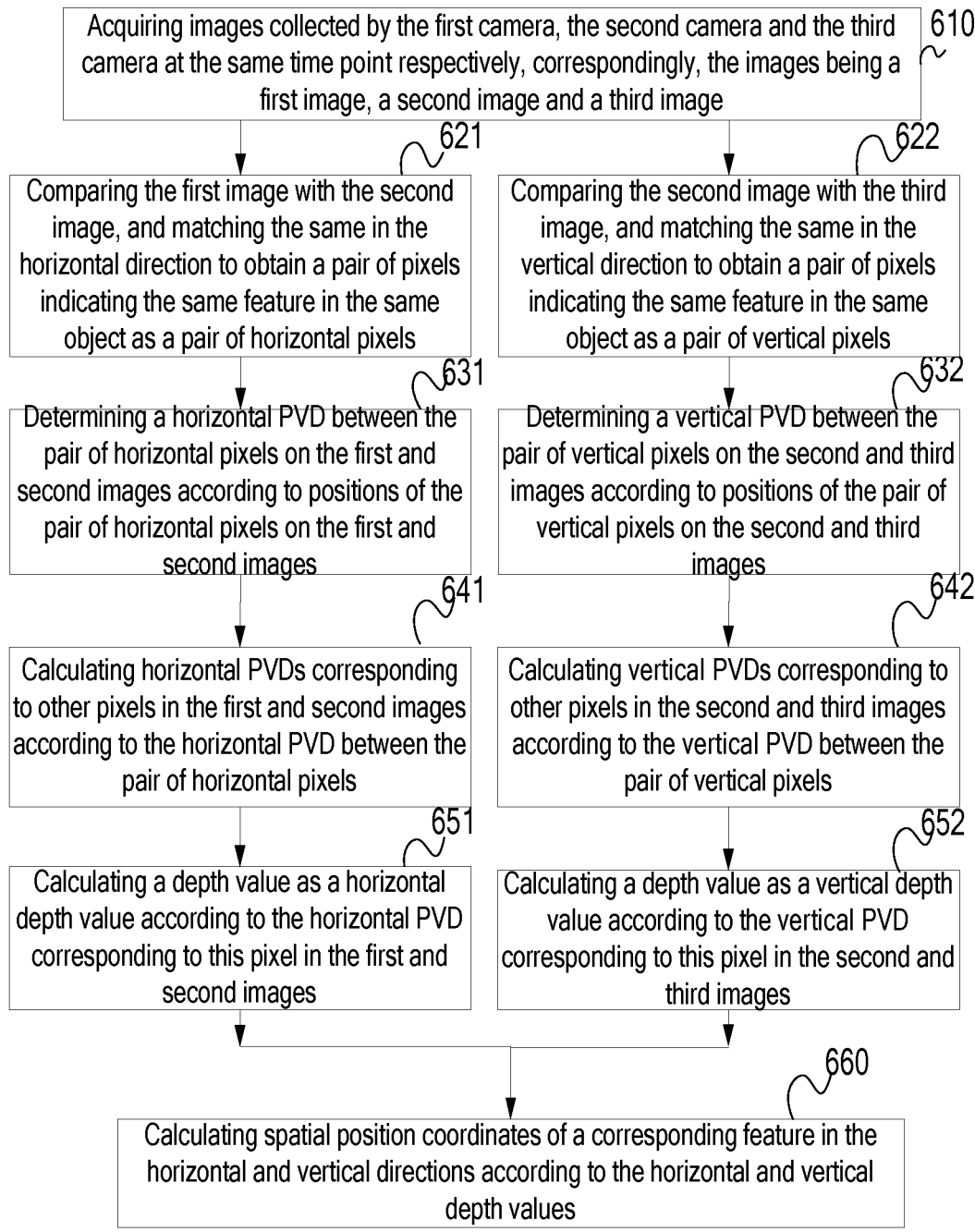
FIG. 6 is a schematic view of a flow chart of a positioning processing method for the spatial positioning device shown in FIG. 5.

FIG. 6 is a schematic view of a flow chart of a positioning processing method for the spatial positioning device shown in FIG. 5.

As shown in FIG. 6, the positioning processing method may comprise the following steps.

In step S610, images collected by the first camera C1, the second camera C2 and the third camera C3 at the same time point are acquired, and correspondingly, are a first image, a second image and a third image.

In step S621, the first image is compared and matched with the second image in the horizontal direction to obtain a pair of pixels indicating the same feature in the same object as a pair of horizontal pixels.

The pair of horizontal pixels is located in the same pixel row but at different pixel positions on the first and second images, so that the pair of horizontal pixels has a horizontal PVD on the first and second images.

In step S631, the horizontal PVD between the pair of horizontal pixels on the first and second images is determined according to the pixel positions of the pair of horizontal pixels on the first and second images.

In step S641, horizontal PVDs corresponding to other pixels in the first and second images are calculated according to the horizontal PVD between the pair of horizontal pixels.

In step S641, for example, the horizontal PVD between the pair of horizontal pixels is used as the known reference PVD, and the horizontal PVDs corresponding to the other pixels in the first and second images are obtained through interpolation.

In step S651, a depth value of a feature indicated by each pixel is calculated as a horizontal depth value according to the horizontal PVD corresponding to this pixel in the first and second images.

In this step, the depth value of the feature F indicated by each pixel in the first and second images may be calculated as the horizontal depth value $F_{zx}$ through the above formula (5).

In step S622, the second image is compared and matched with the third image in the vertical direction to obtain a pair of pixels indicating the same feature in the same object as a pair of vertical pixels.

The pair of vertical pixels is located in the same pixel row but at different pixel positions on the second and third images, so that the pair of vertical pixels has a vertical PVD on the second and third images.

In step S632, the vertical PVD between the pair of vertical pixels on the second and third images is determined according to the pixel positions of the pair of vertical pixels on the second and third images.

In step S642, vertical PVDs corresponding to other pixels in the second and third images are calculated according to the vertical PVD between the pair of vertical pixels.

In step S642, for example, the vertical PVD between the pair of vertical pixels is used as the known reference PVD, and the vertical PVDs corresponding to the other pixels in the second and third images are obtained through interpolation.

In step S652, a depth value of a feature indicated by each pixel is calculated as a vertical depth value according to the vertical PVD corresponding to this pixel in the second and third images.

In this step, the depth value of the feature F indicated by each pixel in the second and third images may be calculated as the vertical depth value $F_{zy}$ through the above formula (10).

In step S660, according to the horizontal and vertical depth values, spatial position coordinates of the corresponding feature in the horizontal and vertical directions are calculated.

In step S660, for the pair of the horizontal cameras C1 and C2, spatial position coordinates in the horizontal and vertical directions of a feature indicated by the horizontal depth value may be calculated according to the above formulas (1) and (2).

In step S660, for the pair of the horizontal cameras C2 and C3, spatial position coordinates in the horizontal and vertical directions of a feature indicated by the vertical depth value may be calculated according to the above formulas (6) and (7).

For example, when a hand feature of a person is collected by the cameras C1 and C2 at the same time point, except for the camera C3, a horizontal PVD between a pair of horizontal pixels indicating the hand feature of the person may be used as a reference PVD to calculate horizontal PVDs corresponding to pixels indicating other features of the person, and accurate spatial position data of the hand feature of the person is calculated by using the horizontal PVD between the pair of horizontal pixels.

For example, when a head feature of the person is collected by the cameras C2 and C3 at the same time point, except for the camera C1, a vertical PVD between a pair of vertical pixels indicating the head feature of the person may be used as a reference PVD to calculate vertical PVDs corresponding to pixels indicating other features of the person, and accurate spatial position data of the head feature of the person is calculated by using the vertical PVD between the pair of vertical pixels.

Further, the measurement of the person, for example, the measurement of a waistline of the person, may be performed based on the spatial position coordinates of all features of the person in the horizontal direction, and the measurement of the person, for example, the measurement of the height of the person, may be performed based on the spatial position coordinates of all features of the person in the vertical direction.

Example 2

On the basis of the spatial positioning device according to the embodiment shown in FIG. 5, the horizontal baseline length a between the pair of the horizontal cameras C1 and C2 may not be equal to the vertical baseline length b between the pair of the vertical cameras C3 and C4. Thus, a contradictory problem in increasing an available depth data range and an overlapping area range of two cameras is effectively solved. The contradiction is reflected as follows.

(1) Referring to FIG. 1, it can be seen that the farther the distance between the two cameras is, the smaller the overlapping area between the two cameras is. Therefore, in order to increase the overlapping area between the two areas to reduce a blind area, it is required to reduce the distance between the two cameras.

(2) Taking a pair of horizontal cameras as an example, the greater the horizontal depth value of a feature point is, the smaller the horizontal PVD between the feature point in the first image and the second image is. As a result, an error of the depth data calculated based on the horizontal PVDs is excessive and the depth data is unavailable. Thus, in order to increase the available depth data range, it is required to increase the distance between the two cameras.

In the embodiment, there are a pair of horizontal cameras and a pair of vertical cameras which share the camera C2. Therefore, if the vertical baseline length b is set to be larger than the horizontal baseline length a, the problem in increasing the overlapping area range may be solved by the pair of horizontal cameras, and the problem in increasing the available depth data range may be solved by the pair of the vertical cameras. If the horizontal baseline length a is set to be larger than the vertical baseline length b, the problem in increasing the overlapping area range may be solved by the pair of vertical cameras, and the problem in increasing the available depth data range may be solved by the pair of the horizontal cameras.

On the basis of solving the above contradictory problem, in order to enable the pair of horizontal cameras and the pair of vertical cameras to have a reasonable overlapping area to obtain as many of pairs of pixels as possible, referring to a human eye pupil distance, the following conditions should be met.

(1) The range of the horizontal baseline length a and the vertical baseline length b may be selected within a range less than or equal to 200 mm. For example, the shorter baseline is 100 mm and the longer baseline is 200 mm.

(2) A ratio of the vertical baseline length b to the horizontal baseline length a is less than or equal to 3.

If in the above spatial positioning device, correspondingly, the horizontal baseline length a of the pair of horizontal cameras C1 and C2 is less than the vertical alignment length b of the pair of vertical cameras C2 and C3, the step S660 may further comprise the following sub-steps.

In step S661, horizontal depth values smaller than a pre-set depth threshold are screened from all the horizontal depth values, and spatial position coordinates of a corresponding feature in the horizontal direction and the vertical direction are calculated.

In step S662, a vertical depth value greater than or equal to the depth threshold is screened from all the vertical depth values, and spatial position coordinates of a corresponding feature in the horizontal direction and the vertical direction are calculated.

If the pre-set depth threshold is 5 m, according to step S661, the horizontal depth values smaller than 5 m are screened from all the horizontal depth values calculated according to the horizontal PVD corresponding to each pixel in the first and second images, so as to calculate spatial position coordinates of the corresponding feature in the horizontal direction and the vertical direction; and according to step S662, the vertical depth value greater than or equal to 5 m is screened from all the vertical depth values calculated according to the vertical PVD corresponding to each pixel in the second and third images, so as to calculate spatial position coordinates of the corresponding feature in the horizontal direction and the vertical direction.

The shorter the horizontal baseline a is, the smaller the depth threshold will be set.

In this example, the accuracy of the measurement of both a feature whose depth value is smaller than the depth threshold in the horizontal direction and a feature whose depth value is greater than or equal to the depth threshold in the vertical direction is higher.

Example 3

The spatial positioning device according to the embodiment of the present invention may also be additionally provided with a fourth camera with the same parameters on the basis of the embodiment shown in FIG. 5. The fourth camera and the first camera C1 are aligned in the horizontal direction to form the other pair of horizontal cameras in the set of cameras arranged horizontally, wherein the first camera C1 and the fourth camera are arranged at the two sides of the second camera C2, respectively.

Further, it is also possible to set the horizontal baseline length a of the pair of horizontal cameras not to be equal to that of the other pair of horizontal cameras to effectively solve a contradictory problem in increasing an available depth data range and an overlapping area range of two cameras. The contradiction is reflected as follows.

In the embodiment, there are provided the first pair of horizontal cameras composed of the first camera and the second camera and the second pair of horizontal cameras composed of the second camera and the fourth camera. Therefore, if the horizontal baseline length between the first pair of horizontal cameras is set to be greater than that between the second pair of horizontal cameras, the problem in increasing the overlapping area range may be solved through the second pair of horizontal cameras, and the problem in increasing the available depth data range may be solved through the first pair of horizontal cameras. If the horizontal baseline length between the first pair of horizontal cameras is set to be less than that between the second pair of horizontal cameras, the problem in increasing the overlapping area range may be solved through the first pair of horizontal cameras, and the problem in increasing the available depth data range may be solved through the second pair of horizontal cameras.

Figure 7:
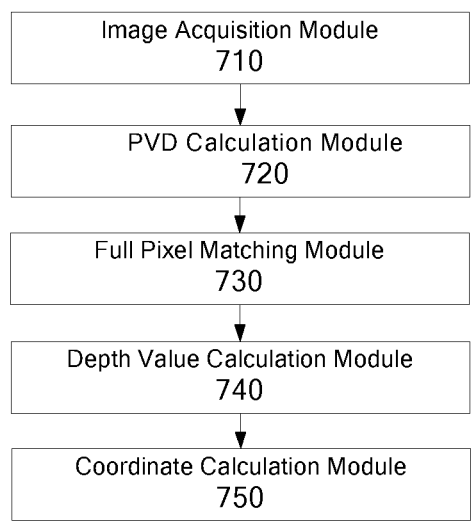
FIG. 7 is a functional block diagram of the positioning processing device according to the embodiment of the present invention.

In this example, each pair in the two pairs of horizontal cameras may obtain spatial position data of the object features according to the positioning processing method shown in FIG. 2 or FIG. 7. Therefore, in this structure, a combination formed by the first camera C1, the second camera C2 and the third camera C3 and sharing the second camera C2, and the other combination formed by the fourth camera, the second camera C2 and the third camera C3 and sharing the second camera C2 are utilized to not only supplement data of the same spatial object feature F, respectively, but also supplement data of the same spatial object feature F in a combined manner by taking the second camera C2 as a reference, so that more accurate and flexible spatial positioning is realized advantageously.

In another example, the fourth camera may also be arranged at the side of the first camera C1, so that the fourth camera and the second camera C2 are arranged at the two sides of the first camera C1, respectively, and the spatial positioning is performed on the spatial object feature F through the set of cameras arranged horizontally in which the first camera C1 is shared.

Example 4

The spatial positioning device according to the embodiment of the present invention may also be additionally provided with a fifth camera with the same parameters on the basis of the embodiment shown in FIG. 5. The fifth camera and the third camera C3 are aligned in the vertical direction to form the other pair of vertical cameras in the set of cameras arranged vertically, wherein the third camera C3 and the fifth camera C5 are arranged at the two sides of the second camera C2, respectively.

Further, it is also possible to set the vertical baseline length b of the pair of vertical cameras not to be equal to that of the other pair of vertical cameras to effectively solve a contradictory problem in increasing an available depth data range and an overlapping area range of two cameras. The specific analysis of the contradiction may refer to relevant description in Example 3, and it will not be repeated herein.

In this example, each pair in the two pairs of vertical cameras may obtain spatial position data of the object features according to the positioning processing method shown in FIG. 2 or FIG. 7. Therefore, in this structure, a combination formed by the first camera C1, the second camera C2 and the third camera C3 and sharing the second camera C2, and the other combination formed by the fifth camera, the second camera C2 and the first camera C1 and sharing the second camera C2 are utilized to not only supplement data of the spatial object feature F, respectively, but also supplement data of the spatial object feature F in a combined manner by taking the second camera C2 as a reference, so that more accurate and flexible spatial positioning is realized advantageously.

In another example, the fifth camera may also be arranged at the side of the third camera C3, so that the fifth camera and the second camera C2 are arranged at the two sides of the third camera C3, respectively, and the spatial positioning is performed on the spatial object feature F through the set of cameras arranged vertically in which the third camera C3 is shared.

In yet another example, the spatial positioning device according to the embodiment of the present invention may also be additionally provided with another camera to be part of the set of cameras arranged horizontally and/or the set of cameras arranged vertically on the basis of the fourth camera and/or the fifth camera.

<Positioning Processing Device>

FIG. 7 is a functional block diagram of the positioning processing device according to an embodiment of the present invention.

Referring to FIG. 7, the positioning processing device provided by the embodiment comprises an image acquisition module 710, a PVD calculation module 720, a full pixel matching module 730, a depth value calculation module 740 and a coordinate calculation module 750.

The image acquisition module 710 is configured to acquire images collected by the set of cameras arranged horizontally and the set of cameras arranged vertically at the same time point, respectively.

The PVD calculation module 720 is configured to calculate a horizontal PVD between a pair of pixels indicating the same feature in the same object according to the images collected by the set of cameras arranged horizontally, and a vertical PVD between a pair of pixels indicating the same feature in the same object according to the images collected by the set of cameras arranged vertically.

The full pixel matching module 730 is configured to calculate horizontal PVDs corresponding to other pixels in the images collected by the set of cameras arranged horizontally according to the horizontal PVDs between pairs of pixels, and vertical PVDs corresponding to other pixels in the images collected by the set of cameras arranged vertically according to the vertical PVDs between pairs of pixels.

The depth value calculation module 740 is configured to calculate a depth value of a feature indicated by each pixel according to the horizontal PVD corresponding to this pixel in the images collected by the set of cameras arranged horizontally as a horizontal depth value, and a depth value of a corresponding feature indicated by each pixel according to the vertical PVD corresponding to this pixel in the images collected by the set of cameras arranged vertically as a vertical depth value.

The coordinate calculation module 750 is configured to calculate according to the horizontal and vertical depth values to obtain spatial position coordinates of a corresponding feature in the horizontal and vertical directions.

Figure 8:
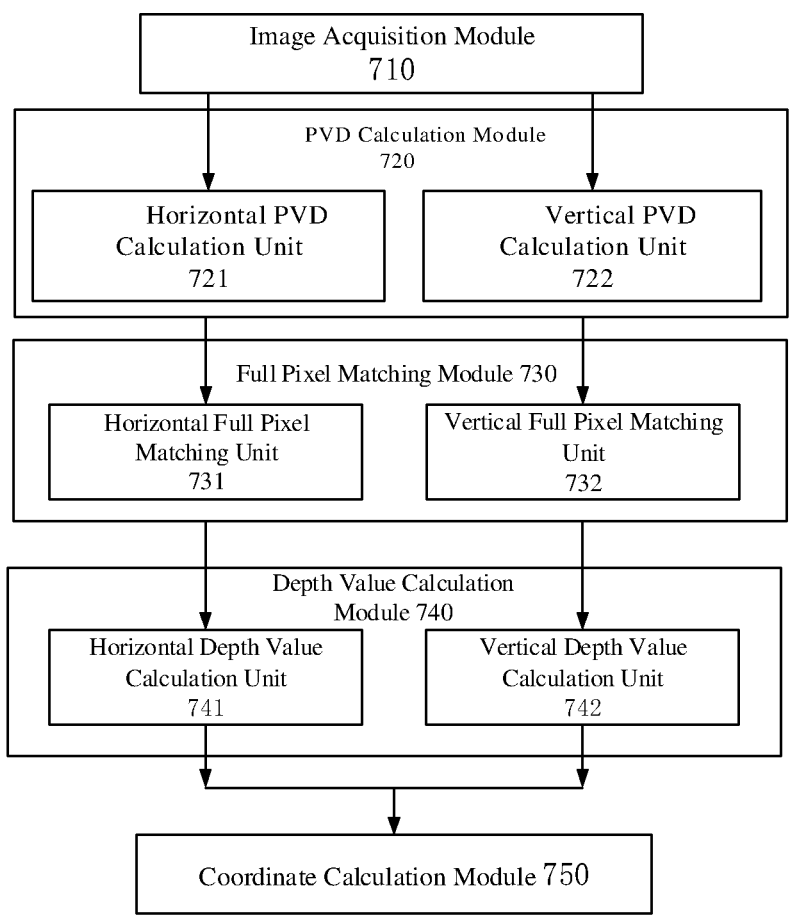
FIG. 8 is a functional block diagram of the positioning processing device for the spatial positioning device shown in FIG. 5.

FIG. 8 is a functional block diagram of the positioning processing device according to another embodiment of the present invention.

The spatial positioning device shown in FIG. 8 is corresponding to that shown in FIG. 5.

In this embodiment, the image acquisition module 710 is configured to acquire images collected by the first camera, the second camera and the third camera at the same time point, respectively, wherein correspondingly, the images are the first image, the second image and the third image.

In this embodiment, the PVD calculation module 720 further comprises a horizontal PVD calculation unit 721 and a vertical PVD calculation unit 722.

The horizontal PVD calculation unit 721 is configured to compare the first image and the second image, match the same in the horizontal direction to obtain a pair of pixels indicating the same feature in the same object as a pair of horizontal pixels, and determine a horizontal PVD between the pair of horizontal pixels on the first image and the second image according to the pixel positions of the pair of horizontal pixels on the first image and the second image.

The vertical PVD calculation unit 722 is configured to compare the second image with the third image, match the same in the vertical direction to obtain a pair of pixels indicating the same feature in the same object as a pair of vertical pixels, and determine a vertical PVD between the pair of vertical pixels on the second image and the third image according to the pixel positions of the pair of vertical pixels on the second image and the third image.

In this embodiment, the full pixel matching module 730 further comprises a horizontal full pixel matching unit 731 and a vertical full pixel matching unit 732.

The horizontal full pixel matching unit 731 is configured to calculate horizontal PVDs corresponding to other pixels in the first and second images according to the horizontal PVD between the pair of horizontal pixels.

The vertical full pixel matching unit 732 is configured to calculate vertical PVDs corresponding to other pixels in the second and third images are calculated according to the vertical PVD between the pair of vertical pixels.

In this embodiment, the depth value calculation module 740 further comprises a horizontal depth value calculation unit 741 and a vertical depth value calculation unit 742.

The horizontal depth value calculation unit 741 is configured to calculate a depth value of a feature indicated by each pixel as a horizontal depth value according to the horizontal PVD between this pixel in the first and second images.

The vertical depth value calculation unit 742 is configured to calculate a depth value of a feature indicated by each pixel as a vertical depth value according to the vertical PVD between each pixel in the second and third images.

In this embodiment, the coordinate calculation module 750 is configured to calculate the spatial position coordinates of the corresponding feature in the horizontal and vertical directions according to the horizontal and vertical depth values.

Further, the coordinate calculation module 750 may be further configured to: screen horizontal depth values smaller than a pre-set depth threshold from all the horizontal depth values, and calculate spatial position coordinates of a corresponding feature in the horizontal direction and the vertical direction; and screen a vertical depth value greater than or equal to the depth threshold from all the vertical depth values, and calculate spatial position coordinates of the corresponding feature in the horizontal direction and the vertical direction.

In this way, the coordinate calculation module 750 may solve the contradictory problem in increasing an available depth data range and an overlapping area range of two cameras.

<Virtual Reality System>

Figure 9:
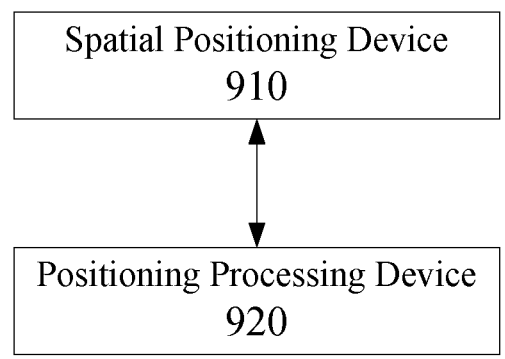
FIG. 9 is a functional block diagram of a virtual reality system according to an embodiment of the present invention.

FIG. 9 is a functional block diagram of a virtual reality system according to an embodiment of the present invention.

As shown in FIG. 9, the virtual reality system includes any of the above spatial positioning devices, and is designated as 910 in FIG. 9.

The spatial positioning device 910, for example, is that shown in FIG. 5.

The virtual reality system further includes any of the above positioning processing devices, for example, the positioning processing device shown in FIG. 7 or FIG. 8, and is designated as 920 in FIG. 9.

The virtual reality system may also comprise a headset device, a control handle, and the like.

The positioning processing device 920 may be integrated with the spatial positioning device 910. The positioning processing device 920 may send spatial position data of a required feature to a host of the virtual reality system via the communication device 430 for human-machine interaction.

The positioning processing device 920 may also at least integrate the first processor with the spatial positioning device 910 and allow part of the processors to be arranged in the host of the virtual reality system. The host may be a fixed host, or a mobile host.

Various embodiments in the present description are described by way of step-up, the same or similar parts among the various embodiments refer to each other, and each embodiment mainly focuses on explaining the differences from other embodiments. However, those skilled in the art should clarify that the above-mentioned embodiments may be used individually or collectively as required. Moreover, the embodiments of the system are relatively simply described as they correspond to the embodiments of the method, and for the relevant portions therebetween, the descriptions of a corresponding portion of the embodiments of the method may be referred to. The above described embodiments of the system are merely illustrative, and all the modules described as separate components may be or may not be physically separated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The scope of the present invention is defined by the attached claims.

What is claimed is:

1. A positioning processing method comprising the steps of:
providing a spatial positioning device comprising a set of cameras arranged horizontally and a set of cameras arranged vertically, each of the set of cameras comprising at least two cameras with the same parameters including an image resolution, a camera lens angle in the horizontal direction, and a camera lens angle in the vertical direction; the at least two cameras in the set of cameras arranged horizontally being aligned in the horizontal direction, and the at least two cameras in the set of cameras arranged vertically being aligned in the vertical direction;
collecting images using the set of cameras arranged horizontally and the set of cameras arranged vertically;
acquiring the images collected by the set of cameras arranged horizontally and the set of cameras arranged vertically at the same time point, respectively;
calculating a horizontal pixel-value difference (PVD) between a pair of pixels indicating the same feature in the same object according to the images collected by the set of cameras arranged horizontally, and calculating a vertical PVD between a pair of pixels indicating the same feature in the same object according to the images collected by the set of cameras arranged vertically;
calculating horizontal PVDs corresponding to other pixels in the images collected by the set of cameras arranged horizontally according to the horizontal PVDs between pairs of pixels, and calculating vertical PVDs corresponding to other pixels in the images collected by the set of cameras arranged vertically according to the vertical PVDs between pairs of pixels;
according to the horizontal PVD corresponding to each pixel in the images collected by the set of cameras arranged horizontally, calculating a depth value as a horizontal depth value, and according to the vertical PVD corresponding to each pixel in the images collected by the set of cameras arranged vertically, calculating a depth value as a vertical depth value; and
calculating according to the horizontal and vertical depth values to obtain spatial position coordinates of a corresponding feature in the horizontal and vertical directions.

2. The positioning processing method of claim 1, wherein the set of cameras arranged horizontally comprises a first camera and a second camera, and the set of cameras arranged vertically comprises the second camera and a third camera.

3. The positioning processing method of claim 2, wherein the horizontal baseline length between the first camera and the second camera is not equal to the vertical baseline length between the second camera and the third camera.

4. The positioning processing method of claim 2, wherein the horizontal baseline length between the first camera and the second camera is less than or equal to 200 mm, and the vertical baseline length between the second camera and the third camera is less than or equal to 200 mm.

5. The positioning processing method of claim 2, wherein the set of cameras arranged horizontally further comprises a fourth camera, and the first camera and the fourth camera are arranged at two sides of the second camera, respectively.

6. The positioning processing method of claim 5, wherein the horizontal baseline length between the first camera and the second camera is not equal to that between the second camera and the fourth camera.

7. The positioning processing method of claim 2, wherein the set of cameras arranged vertically further comprises a fifth camera, and the third camera and the fifth camera are arranged at the two sides of the second camera, respectively.

8. The positioning processing method of claim 7, wherein the vertical baseline length between the second camera and the third camera is not equal to that between the second camera and the fifth camera.

9. The positioning processing method of claim 1, wherein:
the set of cameras arranged horizontally comprises a first camera and a second camera, and the set of cameras arranged vertically comprises the second camera and a third camera; and
the positioning processing method further comprises the steps of:
acquiring images collected by the first camera, the second camera, and the third camera at the same time point respectively, correspondingly, the images being a first image, a second image, and a third image;
comparing the first image with the second image, and matching the same in the horizontal direction to obtain a pair of pixels indicating the same feature in the same object as a pair of horizontal pixels;
determining a horizontal PVD between the pair of horizontal pixels on the first and second images according to the positions of the pair of horizontal pixels on the first and second images;
calculating horizontal PVDs corresponding to other pixels in the first and second images according to the horizontal PVD between the pair of horizontal pixels;
according to the horizontal PVD corresponding to each pixel in the first and second images, calculating a depth value as a horizontal depth value;
comparing the second image with the third image, and matching the same in the vertical direction to obtain a pair of pixels indicating the same feature in the same object as a pair of vertical pixels;
determining a vertical PVD between the pair of vertical pixels on the second and third images according to the positions of the pair of vertical pixels on the second and third images;
calculating vertical PVDs corresponding to other pixels in the second and third images according to the vertical PVD between the pair of vertical pixels;
according to the vertical PVD corresponding to each pixel in the second and third images, calculating a depth value as a vertical depth value; and
calculating spatial position coordinates of a corresponding feature in the horizontal and vertical directions according to the horizontal and vertical depth values.

10. The positioning processing method of claim 9, wherein:
a horizontal baseline length between the first camera and the second camera is less than a vertical baseline length between the second camera and the third camera; and
calculating the spatial position coordinates of the corresponding feature in the horizontal and vertical directions according to the horizontal and vertical depth values comprises:
screening horizontal depth values that smaller than a pre-set depth threshold from all the horizontal depth values, and calculating the spatial position coordinates of the corresponding features in the horizontal direction and the vertical direction; and screening vertical depth values that greater than or equal to the pre-set depth threshold from all the vertical depth values, and calculating the spatial position coordinates of the corresponding features in the horizontal direction and the vertical direction.

11. A processing device of positioning for a spatial positioning device comprising a set of cameras arranged horizontally and a set of cameras arranged vertically, each of the set of cameras comprising at least two cameras with the same parameters including an image resolution, a camera lens angle in the horizontal direction, and a camera lens angle in the vertical direction; the at least two cameras in the set of cameras arranged horizontally being aligned in the horizontal direction and configured to collect images, and the at least two cameras in the set of cameras arranged vertically being aligned in the vertical direction and configured to collect images, the processing device of positioning comprising:

an image acquisition module configured to acquire images collected by the set of cameras arranged horizontally and the set of cameras arranged vertically at the same time point, respectively;

a pixel-value difference (PVD) calculation module configured to calculate a horizontal PVD between a pair of pixels indicating the same feature in the same object according to the images collected by the set of cameras arranged horizontally, and a vertical PVD between a pair of pixels indicating the same feature in the same object according to the images collected by the set of cameras arranged vertically;

a full pixel matching module configured to calculate horizontal PVDs corresponding to other pixels in the images collected by the set of cameras arranged horizontally according to the horizontal PVDs between pairs of pixels, and vertical PVDs corresponding to other pixels in the images collected by the set of cameras arranged vertically according to the vertical PVDs between pairs of pixels;

a depth value calculation module configured to calculate a depth value according to the horizontal PVD corresponding to this pixel in the images collected by the set of cameras arranged horizontally as a horizontal depth value, and a depth value according to the vertical PVD corresponding to this pixel in the images collected by the set of cameras arranged vertically as a vertical depth value; and a coordinate calculation module configured to calculate according to the horizontal and vertical depth values to obtain spatial position coordinates of a corresponding feature in the horizontal and vertical directions.

12. The processing device of positioning of claim 11, wherein:

the set of cameras arranged horizontally comprises a first camera and a second camera, and the set of cameras arranged vertically comprises the second camera and a third camera;

the image acquisition module is configured to acquire images collected by the first camera, the second camera and the third camera at the same time point, correspondingly, the images being a first image, a second image and a third image;

the PVD calculation module comprises a PVD calculation unit and a vertical PVD calculation unit;

the PVD calculation unit is configured to compare the first image with the second image, match the same in the horizontal direction to obtain a pair of pixels indicating the same feature in the same object as a pair of horizontal pixels, and determine a horizontal PVD between the pair of horizontal pixels on the first and second images according to the positions of the pair of horizontal pixels on the first and second images;

the vertical PVD calculation unit is configured to compare the second image with the third image, match the same in the vertical direction to obtain a pair of pixels indicating the same feature in the same object as a pair of vertical pixels, and determine a vertical PVD between the pair of vertical pixels on the second and third images according to the positions of the pair of vertical pixels on the second and third images;

the full pixel matching module comprises a horizontal full pixel matching unit and a vertical full pixel matching unit;

the horizontal full pixel matching unit is configured to calculate horizontal PVDs corresponding to other pixels in the first and second images according to the horizontal PVD between the pair of horizontal pixels;

the vertical full pixel matching unit is configured to calculate vertical PVDs corresponding to other pixels in the second and third images according to the vertical PVD between the pair of vertical pixels;

the depth value calculation module comprises a horizontal depth value calculation unit and a vertical depth value calculation unit;

the horizontal depth value calculation unit is configured to calculate a depth value by each pixel as a horizontal depth value according to the horizontal PVD corresponding to this pixel in the first and second images;

the vertical depth value calculation unit is configured to calculate a depth value as a vertical depth value according to the vertical PVD corresponding to this pixel in the second and third images; and the coordinate calculation module is configured to calculate spatial position coordinates of the corresponding feature in the horizontal and vertical directions according to the horizontal and vertical depth values.

13. The positioning processing device of claim 12, wherein:

a horizontal baseline length between the first camera and the second camera is less than a vertical baseline length between the second camera and the third camera; and the coordinate calculation module is configured to:

screen horizontal depth values that smaller than a pre-set depth threshold from all the horizontal depth values, and calculate the spatial position coordinates of the corresponding features in the horizontal direction and the vertical direction; and screen vertical depth values that greater than or equal to the pre-set depth threshold from all the vertical depth values, and calculate the spatial position coordinates of the corresponding features in the horizontal direction and the vertical direction.

14. The positioning processing device of claim 11, wherein the set of cameras arranged horizontally comprises a first camera and a second camera, and the set of cameras arranged vertically comprises the second camera and a third camera.

15. The positioning processing device of claim 14, wherein the horizontal baseline length between the first camera and the second camera is not equal to the vertical baseline length between the second camera and the third camera.

16. The positioning processing device of claim 14, wherein the horizontal baseline length between the first camera and the second camera is less than or equal to 200 mm, and the vertical baseline length between the second camera and the third camera is less than or equal to 200 mm.

17. The positioning processing device of claim 14, wherein the set of cameras arranged horizontally further comprises a fourth camera, and the first camera and the fourth camera are arranged at two sides of the second camera, respectively.

18. The positioning processing device of claim 17, wherein the horizontal baseline length between the first camera and the second camera is not equal to that between the second camera and the fourth camera.

19. The positioning processing device of claim 14, wherein the set of cameras arranged vertically further comprises a fifth camera, and the third camera and the fifth camera are arranged at the two sides of the second camera, respectively.

20. The positioning processing device of claim 19, wherein the vertical baseline length between the second camera and the third camera is not equal to that between the second camera and the fifth camera.

* * * * *